Figure 1:
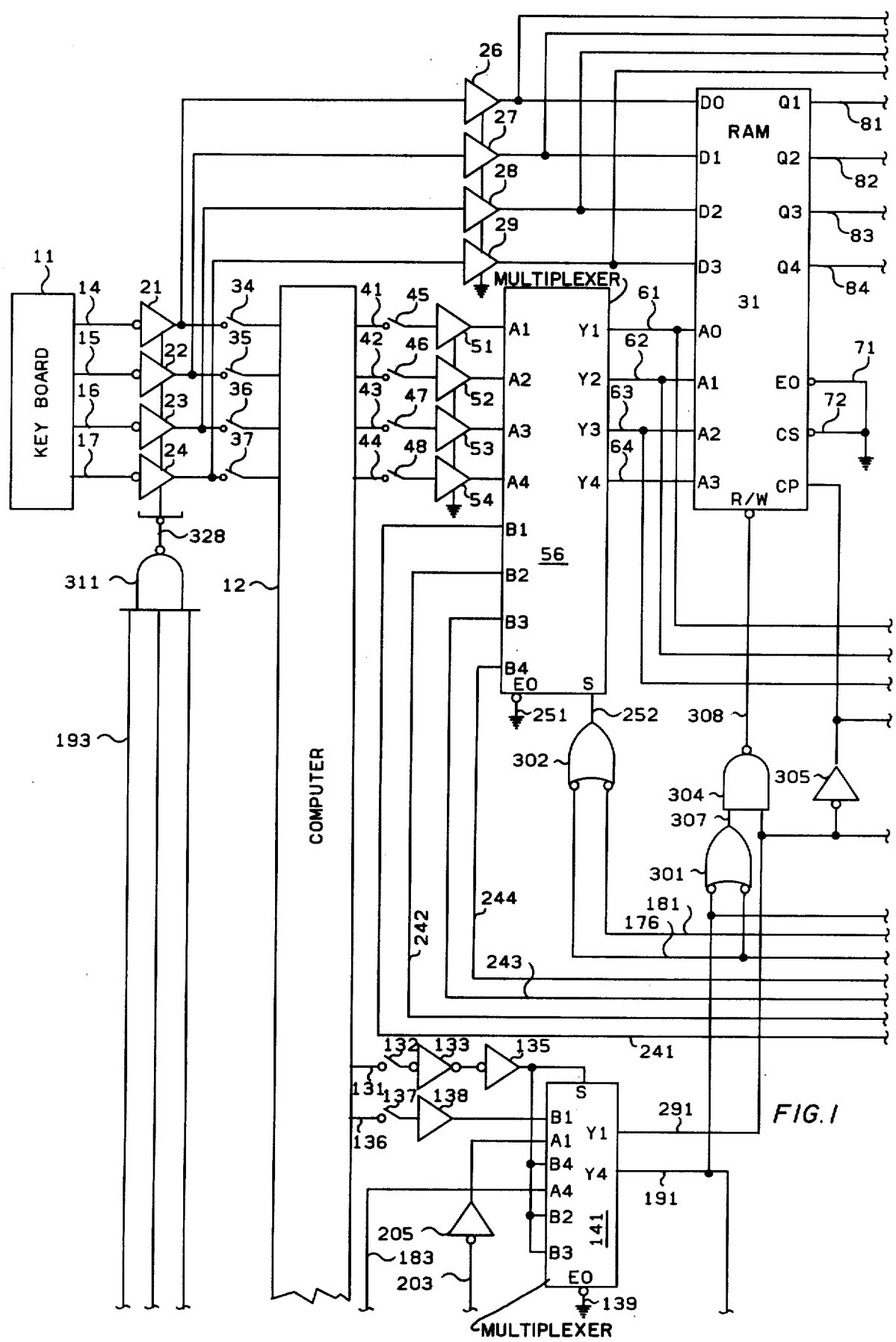

United States Patent [19]
Davis et al.

[11] 4,187,540
[45] Feb. 5, 1980

[54] CONTROL PANEL SELF-TEST

[75] Inventors: Thomas T. Davis; Marvin C. Burk, both of Bartlesville, Okla.

[73] Assignee: Phillips Petroleum Company, Bartlesville, Okla.

[21] Appl. No.: 870,546

[22] Filed: Jan. 18, 1978

[51] Int. Cl.² .................. G06F 11/06; G06F 3/14; G06F 3/02
[52] U.S. Cl. .................... 364/200; 235/302
[58] Field of Search ... 364/200 MS File, 900 MS File, 364/480, 481, 488, 489, 490; 235/302, 304; 324/73 R, 73 AT

[56] References Cited
U.S. PATENT DOCUMENTS

| | | | |
|---|---|---|---|
| 3,453,384 | 7/1969 | Donner | 364/900 |
| 3,719,929 | 3/1973 | Fay | 364/900 |
| 3,725,877 | 4/1973 | Keil | 235/302 |
| 3,831,148 | 8/1974 | Greenwald | 364/200 |
| 3,866,171 | 2/1975 | Loshbough | 235/302 |
| 3,909,802 | 9/1975 | Cassarino, Jr. | 364/200 |

*Primary Examiner*—James D. Thomas

[57] ABSTRACT

A control panel which provides an interface to a digital computer, and which comprises at least a data input device such as a keyboard and a data output device such as an alphanumeric display or a light emitting diode display, is tested without the use of the digital computer. The digital computer is disconnected or bypassed and the timing and other functions of the computer are simulated to enable an independent test of the data input device and the data output device which make up at least a part of the control panel.

14 Claims, 4 Drawing Figures

CONTROL PANEL SELF-TEST

This invention relates to method and apparatus for performing a self-test on a data input device and a data display. In a specific aspect this invention relates to method and apparatus for performing a self-test on a data input device and a data display without the use of a computer. In a second specific aspect, this invention relates to method and apparatus for performing a self-test on a data input device and a data display using only a test circuit which simulates a computer.

The use of digital computer systems has continued to increase because of the development of new applications and because of the decrease in cost of digital computer systems. It has become increasingly popular to utilize a data input device, such as a keyboard, to interface a human operator with the computer and to utilize an alphanumeric display or a simple light display to provide information from the computer to the human operator. A simple example of this is a hand held calculator. More complex examples may be found in control systems applications where control commands are sent to the computer from a keyboard and system status is displayed in an alphanumeric display.

It is desirable to be able to self-test the data input device and data display to insure that they are operational. In the past it has been common to perform such self-test by using the computer. The data input device provided commands to the computer to provide a specific data display. If the test data displayed was valid, the operator could determine that the data input device and data display were operational. However, if the test failed the operator did not know whether the data input device and data display were not operational or whether the computer itself had malfunctioned. Also, when a computer is required to check the data input device and data display, there is no way to self-test the data input device and data display unit during manufacturing before the computer is interfaced to the data input device and data display unit. This causes reliability problems in manufacturing and may lead to extra manufacturing cost and time. For these reasons it is particularly desirable to be able to perform a self-test on a data input device and data display unit without the use of a computer.

Accordingly, it is an object of this invention to provide method and apparatus for performing a self-test on a data input device and a data display. A second object of this invention is to provide method and apparatus for performing a self-test on a data input device and a data display without the use of a computer. A third object of this invention is to provide method and apparatus for performing a self-test on a data input device and a data display using only a test circuit which simulates a computer.

In accordance with the present invention, a system is provided whereby a data input device is interfaced to a computer to allow a human operator to control the computer functions. Information from the computer is supplied to an alphanumeric display and a light display to provide the operator with desired information from the computer. When it is desired to test the data input device and data display unit, the computer is disconnected by means of a switch and a test circuit is utilized to simulate the computer. The data input device sends data directly to the data displays instead of to the computer. This data is displayed and a self-test may be easily performed by checking for a desired display when a certain address is supplied from the data input device. In this way a computer malfunction will not affect the self-test of the data input device and data display unit and a self-test can be performed during manufacturing activities without the necessity of interfacing the data input device and data display unit to a computer.

Figure 2:
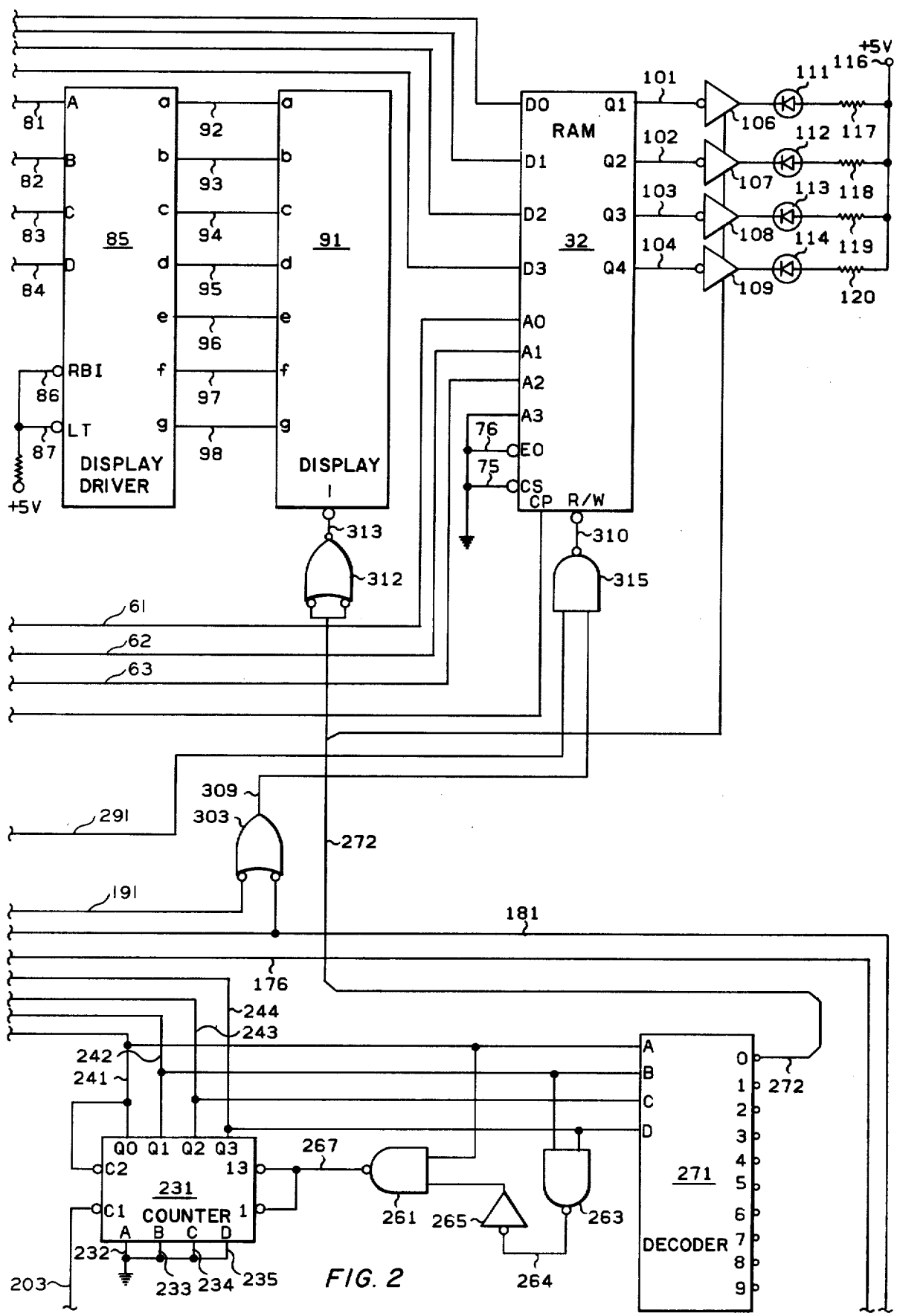
Figure 3:
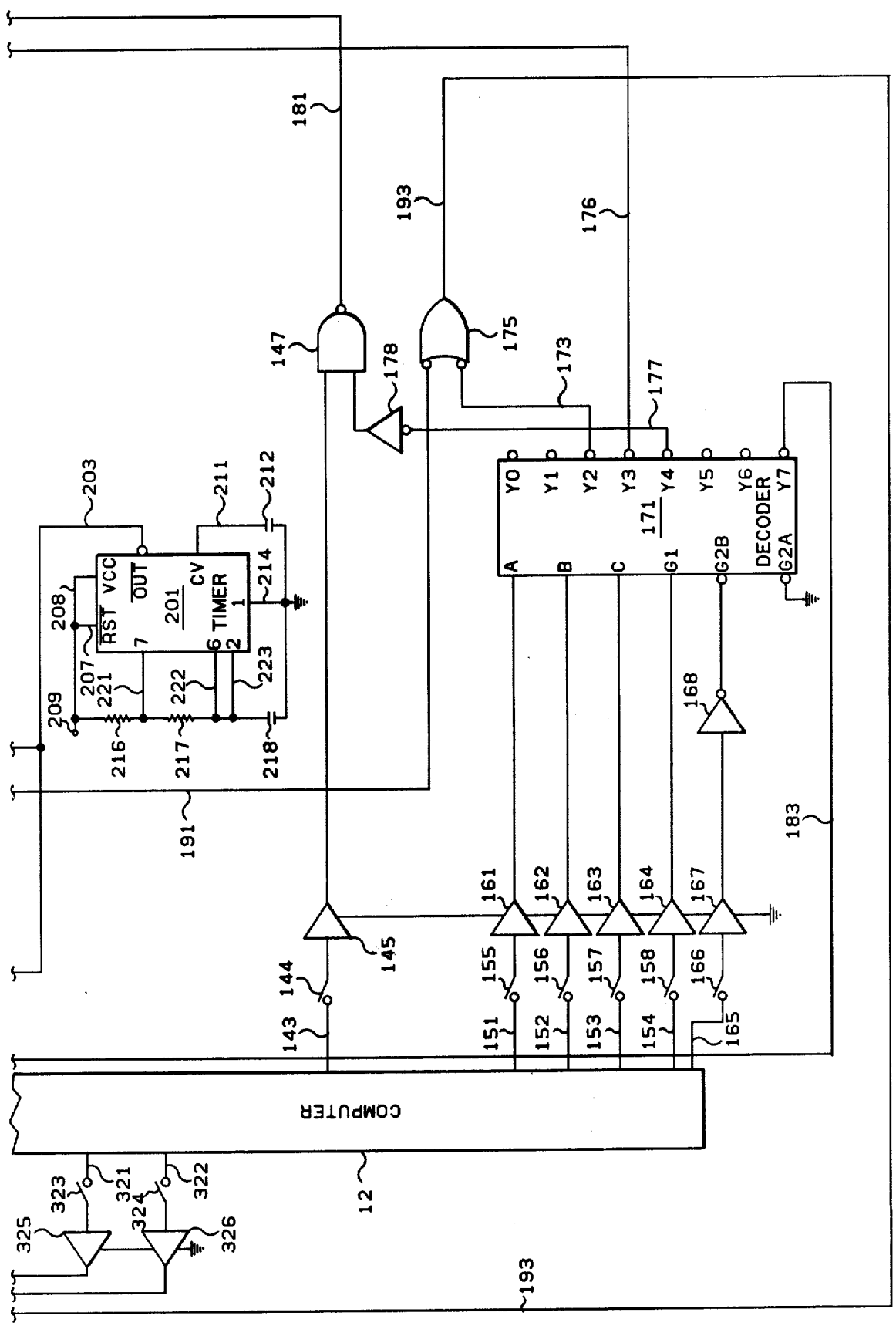
Figure 4:
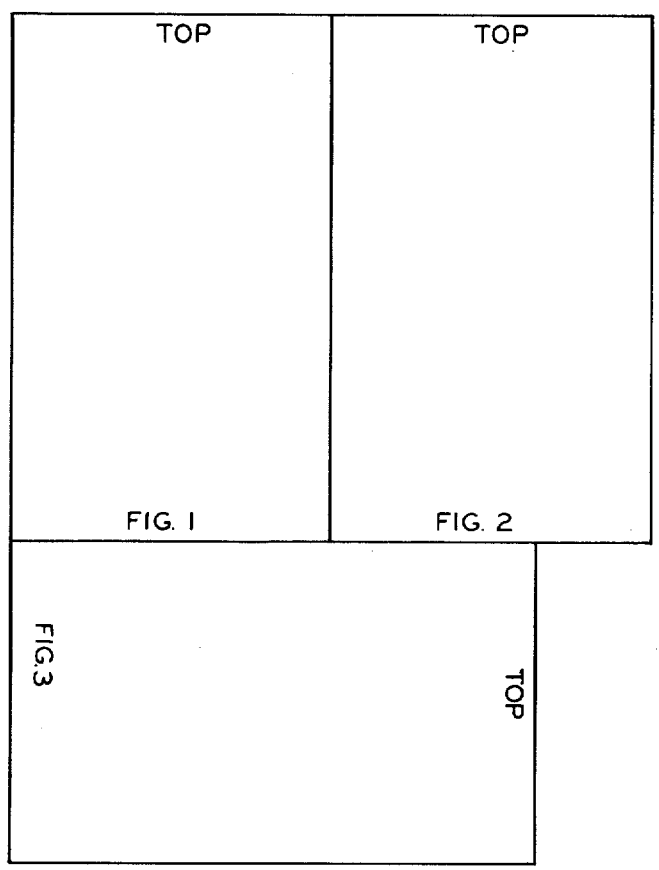

Other objects and advantages of the invention will be apparent from the description of the invention and the appended claims as well as from the detailed description of the drawings in which:

FIGS. 1, 2 and 3, taken together, are a schematic representation of a keyboard, microprocessor, and data display together with associated interfacing and a self-test circuit; and FIG. 4 is a block diagram of the manner in which FIGS. 1, 2 and 3 should be interconnected to make a complete schematic.

Referring now to the drawing, a keyboard 11 is shown which allows a human operator to send commands to the computer means 12. The keyboard 11 is made up of a number of switches which are capable of sending binary data over data lines 14–17. Such keyboards are well known in the art and are commonly used to allow a human operator to control the functions of a computer. The data signals 14–17 represent bits of a binary address. The binary address from the keyboard 11, which is represented by the signals carried over data lines 14–17, is supplied to the tri-state inverters 21–24 respectively. From the outputs of the tri-state inverters 21–24, the address from the keyboard 11 is supplied to the computer means 12 through switching means 34–37.

In this preferred embodiment of the invention, the computer means 12 is a Motorola 6800 Microprocessor. The Motorola 6800 Microprocessor has provisions for accepting eight lines of data input. For the sake of simplicity, only four data lines are shown utilized in the preferred embodiment of this invention. However, it should be recognized that if additional data capacity is needed, the additional data lines which are available may be used to interface the keyboard 11 to the computer means 12.

The binary address from the keyboard 11, represented by the signals carried over data lines 14–17, is also supplied to the input of the tri-state buffers 26–29. The enabling lines of the tri-state buffers 26–29 are always tied low, thus the tri-state buffers 26–29 are always in a conducting state. The binary address from keyboard 11, represented by the signals carried over data lines 14–17, is supplied from the output of the tri-state buffers 26–29 to the data inputs of the random access memory 31 and the random access memory 32.

The output signals 41–44 from the computer means 12, which are representative of the A0–A3 address bits from the Motorola 6800 Microprocessor, are supplied through switching means 45–48 and the tri-state buffers 51–54 to the A1, A2, A3, and A4 inputs of the two-line to one-line data selector/multiplexer 56. The four output signals 61–64 from the selector/multiplexer 56 are supplied to the address inputs of the random access memory 31. The output signal 61–63 from the data selector/multiplexer 56 are supplied to the A0, A1 and A2 address inputs of the random access memory 32. The tri-state output-enable input 71 of the random access memory 31 is tied low together with the chip select input 72 of the random access memory 31. The A3 address line of the random access memory 32 is tied low. The tri-state address-enable input 76 and the chip select input 75 of the random access memory 32 are both tied low.

The output data from the random access memory 31 is supplied through lines 81–84 from the Q1–Q4 outputs of the random access memory 31 to the A, B, C and D inputs of the display driver 85. The ripple blanking input 86 and the light test input 87 of the display driver 85 are tied high. The output signals 92–98 from the a-g outputs of the display driver 85 are supplied to the inputs of the display device 91. The inputs of the display device 91 are labeled a-g.

The data outputs 101–104 from the random access memory 32 are supplied through the tri-state inverters 106–109 to the cathode side of the light emitting diodes 111–114. The anode site of light emitting diodes 111–114 are tied to the +5 V power supply 116 through resistors 117–120.

Signal 131 from the computer means 12, which is representative of the ground signal from the Motorola 6800 Microprocessor, is supplied through switching means 132, tri-state buffer 133, and inverter 135 to the select-input of the two-line-to-one-line data selector/multiplexer 141. Signal 131 is also supplied to the B2, B3 and B4 data inputs of the two-line-to-one-line data selector/multiplexer 141. Signal 136 from the computer means 12, which is representative of the $\phi 2$ strobe output from the Motorola 6800 Microprocessor, is supplied through switching means 137 and tri-state buffer 138 to the B1 data input of data selector/multiplexer 141. The output enable 139 of the data selector/multiplexer 141 is tied low. The enabling lines of the tri-state buffers 133 and 138 are tied low.

The output signal 143 from the computer means 12 corresponds to the A3 address bit from the Motorola 6800 Microprocessor. Signal 143 is supplied through switching means 144 and tri-state buffer 145 to one input of NAND gate 147.

Output signals 151–154 from the computer means 12, which are representative of the A4–A7 address lines from the Motorola 6800 Microprocessor, are supplied through switching means 155–158 and tri-state buffers 161–164 to the A, B and C select inputs of the decoder/demultiplexer 171 and to the G1 enable-input of the decoder/demultiplexer 171. Signal 165 from computer means 12, which is representative of the V/I/O output line from the Motorola 6800 Microprocessor, is supplied through switching means 166, tri-state buffer 167, and inverter 168 to the inverted G2B enable-input of the decoder/demultiplexer 171. The enable lines of the tri-state buffers 145, 161–164 and 167 are all tied to ground. The inverted G2A enable input of the decoder/demultiplexer 171 is also tied to ground.

Signal 173 from the Y2 data output of decoder/demultiplexer 171 is supplied to one inverted input of OR gate 175. Signal 176, which is representative of the Y3 data output from decoder/demultiplexer 171, is supplied to one inverted input of OR gate 301 and one inverted input of OR gate 302. Signal 177, which is representative of the Y4 data output from decoder/demultiplexer 171, is supplied through inverter 178 to the second input of NAND date 147. The output signal 181 from NAND gate 147 is supplied to one inverted input of OR gate 303 and to the second inverted input of OR gate 302. Signal 183, which is representative of the Y7 output from decoder/demultiplexer 171, is supplied to the A4 input of data selector/multiplexer 141.

Signal 191, which is representative of the Y4 output from the data selector/multiplexer 141, is supplied to the second inverted input of OR gate 301 and to the second inverted input of OR gate 303. Signal 191 is also supplied to the second inverted input of OR gate 175. The output signal 193 from OR gate 175 is supplied as one input to NAND gate 311.

Timer 201 is utilized to supply a timing signal 203 to the inverted first clock input of counter 231. Signal 203 is also supplied through inverter 205 to the A1 input of data selector/multiplexer 141. The reset input 207 and the supply voltage input 208 of the timer 201 are both tied to the +5 V power supply 209. The control voltage input 211 of the timer 201 is tied to ground through capacitor 212 which in this preferred embodiment is a 0.01 microfarad capacitor. Input 214 of the timer 201 is also tied to ground. The +5 V power supply 209 is also tied to ground through the resistance capacitance network made up of resistors 216 and 217 and capacitor 218. In this preferred embodiment, resistor 216 and 217 are 33K ohm resistors and capacitor 218 is a 0.01 microfarad capacitor. Input 221 to the timer 201 is tied between resistor 216 and resistor 217. Inputs 222 and 223 to the timer 201 are tied between capacitor 218 and resistor 217.

The A, B, C and D data inputs to the counter 231, which are represented by signals 232–235, are all tied to ground. The outputs from the counter 231 represented by signals 241–244 are supplied to the B1–B4 data inputs of data selector/multiplexer 56. The output enable input 251 of data selector/multiplexer 56 is tied to ground. The output signal 252 from OR gate 302 is tied to the select input of data selector/multiplexer 56.

The output signal 241 from the counter 231 is also tied to the inverted second clock input of the counter 231 and to one input of NAND gate 261. The output signal 242 from the counter 231 is also tied to one input of NAND gate 263. The output signal 244 from the counter 231 is also tied to the second input of NAND gate 263. The output signal 264 from NAND gate 263 is supplied through inverter 265 to the second input of NAND gate 261. The output signal 267 from the NAND gate 261 is supplied to the inverted clock input of counter 231, which is shown as input 1, and to the inverted clear input of counter 231, which is shown as input 13.

The output signals 241–244 are also supplied to the data inputs of decoder 271. The inverted output signal 272 from decoder 271 is supplied to both inverted inputs of NOR gate 312 and is also supplied to the enabling lines of the tri-state inverters 106–109. If it is desired to use a plurality of display devices, then the remaining output lines on decoder 271 may be used to enable a plurality of display devices. The output signal 313 from NOR gate 312 is supplied to the inverted enabling input of display 91, which is shown as input 1.

Signal 291 from the data selector/multiplexer 141, which is representative of the Y1 data output from the data selector/demultiplexer 141, is supplied to one input of both NAND gates 304 and 315. Signal 291 is also supplied through inverter 305 to the clock inputs of both random access memory 31 and 32. The output signal 307 from OR gate 301 is supplied to the second input of NAND gate 304. The output signal 308 from NAND gate 304 is supplied to the inverted read/write input of random access memory 31. The output signal 309 from OR gate 303 is supplied to the second input of NAND gate 315. The output signal 310 from NAND gate 315 is supplied to the inverted read/write input of random access memory 32.

The output signals 321 and 322 from computer means 12, which are representative of the A0 address line and the read/write line from the Motorola 6800 Microprocessor, are supplied through switching means 323 and 324 and tri-state buffers 325 and 326 to the second and third inputs of NAND gate 311. The enabling lines of tri-state buffers 325 and 326 are tied to ground. The output signal 328 from the NAND gate 311 is tied to the enabling lines of tri-state inverters 21-24.

Under normal system operation, all of the switches associated with the input and output lines to the computer means 12 are in a closed position. When it is desired to transmit data from the keyboard to the computer means 12, the enabling lines of the tri-state inverters 21-24 are held low, allowing data to be transmitted to the data inputs of computer means 12 and to the data inputs of the random access memories 31 and 32. From computer means 12, an address represented by signals 41-44 is provided to the A1-A4 inputs of data selector/multiplexer 56. This address is a four bit binary address and is utilized to select the memory location at which data will be written into the random access memory 31. An address is also present on the B1-B4 address inputs of data selector/multiplexer 56 from the counter 231. When it is desired to utilize the address from the computer means 12, the output signal 252 from the OR gate 302 is held low and the address appearing at the A1-A4 inputs of data selector/multiplexer 56 is selected and provided to the outputs of the data selector/multiplexer 56 shown as signals 61-64. The output signals 61-64 from the data selector/multiplexer 56 are provided to the A0-A3 address inputs of the random access memory 31 and are utilized to select the memory location at which the data, appearing at the D0-D3 data inputs of the random access memory 31, will be written. Signals 61-63 are also supplied to the address inputs of random access memory 32 and are also utilized to select the memory location where the data appearing at the D0-D3 data inputs of the random access memory 32 will be written. When output signal 308 from NAND gate 304 is high, data is written into the random access memory 31. When the output signal 308 from NAND gate 304 is low, data is read out of the random access memory 31 and is represented as signals 81-84. Signals 81-84 from the random access memory 31 are supplied to the inputs of the display driver 85 which drives the display device 91. The display device 91 is controlled by the output signal 313 from NOR gate 312 in response to the output signal 272 from the decoder 271. When signal 272 from decoder 271 goes low the display 91 will be enabled. The output signal 272 from decoder 271 is low only one-tenth of the time but the frequency is sufficient to make it appear to the human observer that display 91 is lit continuously.

The data present at the D0-D3 inputs of the random access memory 32 is written into the random access memory 32 in the write cycle and is read out as signals 101-104 in the read cycle. Signals 101-104 from the random access memory 32 are provided through the tri-state inverters 106-109 to the light emitting diodes 111-114. The tri-state inverters 106-109 are enabled only one-tenth of the time but the frequency is again sufficient to make it appear that the light emitting diodes 111-114 will appear to the human observer to be lit continuously.

When it is desired to test the keyboard 11 and the display made up of display device 91 and light emitting diodes 106-109, all of the switches associated with the input and output lines from the computer means 12 are opened. Data is still provided from the keyboard 11 to the data inputs of the random access memories 31 and 32. However, the timing signals are now being supplied by timer 201 rather than computer means 12.

When the switches associated with the input and output lines to computer means 12 are open, signal 252 from OR gate 302 goes high and the B1-B4 inputs are selected by data selector/multiplexer 56 to be provided to the Y1-Y4 outputs of data selector/multiplexer 56. Signals 61-64, representative of the outputs from data selector/multiplexer 56, are still provided to the random access memory 31 and signals 61-63 are also still provided to the random access memory 32. However, in this case the memory location selected is controlled by the counter 231 rather than the computer means 12. On the write cycle data is written from the keyboard 11 into the random access memory 31. On the read cycle this data is provided to the display driver 85 which drives the display device 91. The data from the keyboard is also written into random access memory 32 on the write cycle and is provided to the light emitting diodes 111-114 on the read cycle. The timing signal 272 from decoder 271 to the display device 91 and the tri-state inverters 106-109 is still the same as previously discussed.

It is now possible to perform simple tests of the keyboard 11 and the display made up of display device 91 and light emitting diodes 106-109. An example of a simple test which could be performed is to have the display device 91 display an alphanumeric 1 when the key representing 1 is depressed on the keyboard 11. The light emitting diodes 106-109 would also display a 1 in binary pattern where the light emitting diode 106 is the least significant bit of the binary pattern. In this manner a simple test could be performed whereby the key representing 1 was depressed on the keyboard. The operator then could look to see that an alphanumeric 1 was displayed by display device 91 and that only light emitting diode 106 was lit, representing a binary 1. This pattern could be continued for all the keys on the keyboard 11 where the display device 91 has a specific display associated with each key on the keyboard 11 and where a specific binary pattern is displayed by the light emitting diodes 106-109 in response to the depressing of a certain key on the keyboard 11. Other simple tests could be developed, depending upon the capabilities of the keyboard 11 and the complexity of the display utilized.

After the self-test of the keyboard 11 and the display made up of display device 91 and light emitting diodes 106-109 is completed, the switches associated with the input and output lines from computer means 12 are closed and system operation can continue as desired. It should be noted that as has been previously discussed, the test of the keyboard 11 and the display made up of display device 91 and light emitting diodes 106-109 could be carried out in the factory during the manufacturing phase for the equipment. There is no necessity that the computer be available to be switched into the system to carry out the self-test features of the invention.

The invention has been described in terms of its presently preferred embodiment as is shown in FIGS. 1, 2 and 3. For the sake of convenience, many of the signals which supply power to the various chips shown in the schematics of FIGS. 1, 2 and 3 have been omitted. Voltage levels required by the various chips are specified by the manufacturers and are well known to those familiar with the art.

Many different circuit configurations are possible which would perform the functions required of the circuits shown in FIGS. 1, 2 and 3. FIGS. 1, 2 and 3 are illustrative of a particular circuit configuration which will perform the required functions.

Specific components which are available commercially and which can be used in the practice of the invention as shown in FIGS. 1, 2 and 3 follow. Values of resistors and capacitors used are also given. Again, many different combinations of circuit values, particularly in the area of resistance and capacitance values are possible.

| | |
|---|---|
| Random Access Memories 31 and 32 | FC 9410, Fairchild Semiconductor |
| Data Selector/Multiplexer 56 and 141 | 74LS157, National Semiconductor |
| Display driver 85 | DM 8857, National Semiconductor |
| Display 91 | HP 7740, Hewlett-Packard |
| Counter 231 | 74LS197, National Semiconductor |
| Timer 201 | NE555, Signetics |
| Decoder/Demultiplexer 171 | 74LS138, National Semiconductor |
| Decoder 271 | 74LS42, National Semiconductor |
| Tristate buffers 21–24, 106–109 | 74LS369, National Semiconductor |
| Tristate buffers 51–54, 26–29, 133, 138, 145, 161–164, 167, 325 & 326 | 74LS367, National Semiconductor |
| Switching means 34–37, 45–48, 132, 137,144,155–158,166,323 & 324 | 3431-203 Header plus 3414-3000 Connector, Minnesota Mining & Mfg. Co. |
| Light emitting diodes 111–114 | FLV550, Fairchild Semiconductor |
| Resistors 117–120 | 120 Ω, RN60D, Mepco |
| Inverters 205,168,135,265,178 & 305 | 74LS04, National Semiconductor |
| NAND gates 147,263,261,304 & 315 | 74LS00, National Semiconductor |
| OR gates 175,301,302 & 303 which operate as NAND gates | 74LS00, National Semiconductor |
| Triple input NAND gate 311 | 74LS10, National Semiconductor |
| Driver 312 | LM75451, National Semiconductor |
| Resistors 216 & 217 | 33 KΩ, RN55D, Mepco |
| Capacitors 212 & 218 | .01 μf, Sprague, 7CZ5U103X0050D1 |

While the invention has been described in terms of the presently preferred embodiment, reasonable variations and modifications are possible by those skilled in the art, within the scope of the described invention and the appended claims. A more comprehensive data display may be utilized as has been stated. Also changes such as changing the number of address lines or the manner in which the random access memories are utilized are within the scope of the invention.

That which is claimed is:

1. Apparatus comprising:
   means for supplying a first binary address;
   a computer means;
   means for transmitting said first binary address to said computer means, said computer means performing a predetermined function in response to said first binary address;
   a data display means;
   means for transmitting data from said computer means to said data display means; and
   means for testing said means for supplying said first binary address and said data display means, said means for testing said means for supplying said first binary address and said data display means including means for bypassing said computer means so as to supply said first binary address to said data display means, said data display means displaying a predetermined response to said first binary address if a malfunction does not occur in said means for supplying said first binary address and said data display means, said data display means displaying a response, other than said predetermined response, to said first binary address if a malfunction does occur in said means for supplying said first binary address or said data display means.

2. Apparatus in accordance with claim 1 wherein said means for bypassing said computer means so as to supply said first binary address to said data display means comprises:
   a memory means;
   a data display driver means;
   means for writing said first binary address into said memory means on the data input lines of said memory means; and
   means for reading said first binary address out of said memory means to said display driver means in such a manner that said display driver means drives said data display means in response to said first binary address.

3. Apparatus in accordance with claim 2 wherein said means for testing said means for supplying said first binary address and said data display means additionally comprises:
   means for generating a timing signal to be utilized as a clock pulse;
   binary counter means;
   means for transmitting said timing signal to said binary counter means;
   means for transmitting a second binary address, generated by said binary counter means in response to said timing signal, from said binary counter means to the address inputs of said memory means, said second binary address being utilized to select the memory location of said memory means to which said first binary address will be written;
   means for placing said memory means in a write cycle in such a manner that said first binary address is written into the memory location, of said memory means, which was selected by said second binary address;
   means for placing said memory means in a read cycle, after said first binary address has been stored in said memory means, in such a manner that said first binary address is read out of said memory means and is transmitted to said data display driver means, said data display driver means driving said data display means in response to said first binary address.

4. Apparatus in accordance with claim 3 wherein said means for transmitting said second binary address from said binary counter means to said memory means comprises:
   a data selector means;
   means for transmitting said second binary address from said binary counter means to a first input of said data selector means; and
   means for enabling said data selector means to transfer said second binary address to the address inputs of said memory means, when it is desired to perform said test of said means for supplying a first binary address and said data display means.

5. Apparatus in accordance with claim 4 additionally comprising means for transmitting a third binary address from said computer means to a second input of said data selector means, said third binary address being transmitted to the address inputs of said memory means when said test, of said means for supplying a first binary address and said data display means, is not being performed.

6. Apparatus in accordance with claim 5 wherein said means for supplying said first binary address is a keyboard means.

7. Apparatus in accordance with claim 6 wherein said first binary address is transmitted from said keyboard means in response to the depressing of a key on said keyboard means; and
   said first binary address is written into said memory means in response to the depressing of said key on said keyboard means.

8. Apparatus in accordance with claim 7 wherein said memory means is a random access memory means.

9. Apparatus in accordance with claim 8 wherein said display means is an alphanumeric display.

10. Apparatus in accordance with claim 9 wherein said display means is at least one light emitting diode.

11. A method for testing a means for supplying a first binary address and a data display means, where said first binary address is supplied to a computer means, said computer means performing a predetermined function and displaying data on said data display means in response to said first binary address, comprising the step of bypassing said computer means so as to supply said first binary address to said data display means, said data display means displaying a predetermined response to said first binary address if a malfunction does not occur in said means for supplying said first binary address and said data display means, said data display means displaying a response, other than said predetermined response, to said first binary address if a malfunction does occur in said means for supplying said first binary address or said data display means.

12. A method in accordance with claim 11 wherein said step of bypassing said computer means so as to supply said first binary address to said data display means comprises:
   writing said first binary address into memory;
   reading said first binary address out of said memory; and
   driving said data display means in response to said first binary address which was read out of said memory.

13. A method in accordance with claim 12 wherein said step of writing said first binary address into said memory comprises:
   transmitting said first binary address to the data inputs of said memory;
   generating a timing signal to be utilized as a clock pulse;
   transmitting a second binary address, generated in response to said timing signal, to the address inputs of said memory, said second binary address being utilized to select the memory location, in said memory, to which said first binary address will be written; and
   enabling said memory so that said first binary address is written into the memory location, in said memory, selected by said second binary address.

14. A method in accordance with claim 13 wherein said step of transmitting said second binary address to said address inputs of said memory comprises:
   generating a third binary address, said third binary address being available to be transmitted to said address inputs of said memory; and
   enabling the selection of said second binary address to be transmitted to said address inputs of said memory when it is desired to perform said test of said means for supplying a first binary address and said data display means.

* * * * *